United States Patent [19]

Sato et al.

[11] Patent Number: 5,207,306
[45] Date of Patent: May 4, 1993

[54] DEVICE FOR OPERATING CLUTCH OF VEHICLE

[75] Inventors: Kenichi Sato; Eisaku Shinohara; Takeshi Imamura; Masaru Nakata, all of Sakai, Japan

[73] Assignee: Kabushiki Kaisha Kubota, Osaka, Japan

[21] Appl. No.: 651,381

[22] PCT Filed: July 4, 1990

[86] PCT No.: PCT/JP90/00862
§ 371 Date: Mar. 4, 1991
§ 102(e) Date: Mar. 4, 1991

[87] PCT Pub. No.: WO91/00440
PCT Pub. Date: Jan. 10, 1991

[22] Filed: Mar. 4, 1991

[30] Foreign Application Priority Data

Jul. 4, 1989 [JP] Japan ................................ 1-172802
Oct. 18, 1989 [JP] Japan ............................ 1-122650[U]

[51] Int. Cl.⁵ ...................... F16D 25/08; F16D 25/12; F02N 11/10; F02N 15/10
[52] U.S. Cl. .............................. 192/0.084; 192/30 W; 192/85 CA; 192/91 A
[58] Field of Search ............... 192/0.084, 30 W, 91 A, 192/85 CA; 92/128, 107; 60/328, 534

[56] References Cited

U.S. PATENT DOCUMENTS

| | | | |
|---|---|---|---|
| 2,740,512 | 4/1956 | Fischer | 92/107 X |
| 2,917,277 | 12/1959 | Pine | 92/107 X |
| 3,687,253 | 8/1972 | Bjorklund | 192/91 A |
| 4,526,258 | 7/1985 | Huber | 192/91 A X |
| 4,601,374 | 7/1986 | Ladin | 192/85 CA |
| 4,620,625 | 11/1986 | Ladin | 192/91 A X |
| 4,621,565 | 11/1986 | Leigh-Monstevens | 192/0.084 X |
| 4,660,702 | 4/1987 | Flotow | 192/91 A X |
| 4,684,003 | 8/1987 | Leigh-Monstevens | 192/91 A X |
| 4,705,151 | 11/1987 | Leigh-Monstevens et al. | 192/0.096 X |
| 4,848,549 | 7/1989 | Kammler et al. | 192/91 A X |
| 4,915,202 | 4/1990 | Leigh-Monstevens et al. | 192/85 CA |
| 4,938,332 | 7/1990 | Thomas et al. | 192/91 A X |
| 4,960,193 | 10/1990 | Hodge | 192/91 A |
| 4,993,529 | 2/1991 | Leigh-Monstevens et al. | 192/91 A X |

FOREIGN PATENT DOCUMENTS

| | | |
|---|---|---|
| 41-16822 | 8/1966 | Japan . |
| 48-44501 | 12/1973 | Japan . |
| 51-58285 | 10/1974 | Japan . |
| 53-43155 | 9/1976 | Japan . |
| 55-132311 | 3/1979 | Japan . |
| 57-9625 | 1/1982 | Japan . |
| 57-30506 | 7/1982 | Japan . |
| 58-17939 | 4/1983 | Japan . |
| 59-1820 | 1/1984 | Japan . |
| 60-175916 | 11/1985 | Japan . |
| 61-154329 | 9/1986 | Japan . |
| 63-126647 | 8/1988 | Japan . |
| 1-169127 | 7/1989 | Japan . |

Primary Examiner—Rodney H. Bonck

[57] ABSTRACT

The present invention provides a clutch operating device for use in vehicles for pushing out the clutch disengaging members (5) of a dry disk clutch (1) which is disposed between a flywheel (2) mounted on the output shaft of an engine and a propeller shaft (3) rotatably supported by a support wall (10) of a transmission case, the device being characterized in that the device comprises an annular cylinder chamber (A) provided on the support wall (10) concentrically with the propeller shaft (3), an annular piston (17) axially slidably fitted in the cylinder chamber (A), a release bearing (16) mounted on the forward end of the piston (17) and engageable with the clutch disengaging members (5) by contact therewith, and structure (23) for supplying a pressure oil to the cylinder chamber (A) by depressing a clutch pedal (20) to push out the piston (17) toward the clutch disengaging members (5).

15 Claims, 12 Drawing Sheets

DEVICE FOR OPERATING CLUTCH OF VEHICLE

TECHNICAL FIELD

The present invention relates to a device for operating the clutch of a vehicle such as a tractor.

BACKGROUND ART

For example, the main clutch of a farm tractor is provided between a flywheel mounted on the crankshaft of an engine and a propeller shaft rotatably supported by the wall of a clutch housing. A release hub mounted on the propeller shaft is axially shifted by depressing a clutch pedal to thereby cause a release bearing on the hub to push clutch disengaging members, whereby the clutch is disengaged (see, for example, Unexamined Japanese Utility Model Publication SHO 57-9625).

With the clutch operating device described, the depression of the clutch pedal is transmitted through an arm, and a link or wire to a clutch release fork, which in turn pushes the release hub.

The conventional clutch operating device necessitates many parts, such as arm, link or wire, clutch release fork and pivot, is complex in construction, is not fully resistant to great loads and requires a great force to depress the pedal.

Accordingly, the specification of U.S. Pat. No. 3,687,253, for example, discloses a device adapted to operate a clutch with a small fluid pressure instead of the above mechanical means.

This conventional clutch operating device of the fluid pressure type has a stationary sleeve fitted around a propeller shaft concentrically therewith and projecting from the support wall of a transmission case toward the clutch. The stationary sleeve has a peripheral shoulder, a reduced diameter end portion closer to the clutch, and a large diameter base portion adjacent to the support wall. A movable sleeve is slidably fitted around the reduced diameter portion of the stationary sleeve. The movable sleeve carries a release bearing, which is engageable with clutch disengaging members. A collar is axially slidably fitted around the large diameter portion of the stationary sleeve and around one end portion of the movable sleeve. The collar is axially shiftable by the pivotal movement of a yoke, which is coupled to a clutch pedal. The shoulder of the stationary sleeve, the end face of the movable sleeve and the inner surface of the collar define a fluid chamber, to which a fluid is supplied by a pump. The fluid supplied to the fluid chamber flows through a clearance between the end portion of the movable sleeve and the inner surface of the collar and is forced out from passages communicating with the outside and sprayed on the clutch disk to cool the clutch.

To disengage the clutch with use of the conventional operating device of the fluid pressure type, the yoke is pivotally moved by depressing the clutch pedal, whereby the collar is shifted toward the movable sleeve. The shift of the collar diminishes the clearance of the fluid chamber formed between the movable sleeve and the collar inner surface to increase the fluid pressure within the fluid chamber and push the movable sleeve with the pressure. The movable sleeve in turn pushes the clutch disengaging members to disengage the clutch.

However, the conventional device is not usable for disk clutches of the dry type since it is adapted to force out the fluid from the fluid passages and cool the disk at all times.

Further although the conventional clutch operating device of the fluid pressure type is adapted to engage and disengage the clutch by depressing the clutch pedal, the operator is unable to detect deliberate slipping of the clutch from the resistance to the depressing action.

With the aforementioned mechanical clutch operating device, the pressure of the clutch disk can be sensed as resistance to depression, so that the clutch in the state of deliberate slipping can be detected by the foot for delicate manipulation. However, with the conventional fluid pressure-type device wherein the collar is shifted to merely control the clearance, the operator is unable to sense the clutch slipping with his foot and therefore experiences difficulty in manipulating the clutch delicately.

Further with the fluid pressure device wherein the yoke is manipulated as in the mechanical device, the clutch pedal must be coupled to the yoke with a wire, rod or the like. It is therefore impossible to simplify the construction.

DISCLOSURE OF THE INVENTION

An object of the present invention is to provide a clutch operating device which is simple in construction, can be manipulated with a small depressing force and permits the operator to sense the state of the clutch being operated with his foot so that the clutch can be operated delicately in the state of deliberate slipping.

To fulfill the above object, the present invention provides a clutch operating device for use in vehicles for pushing the clutch disengaging members of a dry disk clutch which is disposed between a flywheel mounted on the output shaft of an engine and a propeller shaft rotatably supported by a support wall of a transmission case, the device being characterized in that the device comprises:

an annular cylinder chamber provided on the support wall concentrically with the propeller shaft,
an annular piston axially slidably fitted in the cylinder chamber,
a release bearing mounted on the forward end of the piston and engageable with the clutch disengaging members by contact therewith, and
means for supplying a pressure oil to the cylinder chamber by depressing a clutch pedal to push out the piston toward the clutch disengaging members.

According to the present invention, the pressure oil is supplied from the oil supplying means to the cylinder chamber via a suitable oil channel. Since the annular piston of a release hub is fitted in the cylinder chamber, the piston is pushed over the entire circumference thereof in the axial direction with the pressure oil, whereby the release bearing is brought into contact with the clutch disengaging members to push the members and disengage the clutch.

At this time, the resistant force of the clutch disk acting on the clutch disengaging members against the pushing action is transmitted to the working oil in the cylinder chamber, and this reaction is sensed by the foot depressing the clutch pedal. Thus, the operator can recognize deliberate slipping of the clutch for delicate manipulation.

Further according to the invention, the pedal-operated oil supplying means can be connected to the cylinder chamber by a pipe or piping. This eliminates the need for the conventional link mechanism for moving the yoke, hence a simplified construction.

According to the present invention, the cylinder chamber can be in the form of an annular space formed between a tubular portion surrounding the propeller shaft and projecting from the support wall toward the clutch and a hollow cylinder provided around the tubular portion. The cylinder can be in screw-thread engagement with the tubular portion.

The cylinder chamber can be in the form of an annular space formed in the support wall.

A bearing can be interposed between the inner surface of the tubular portion and the propeller shaft.

An elastic member can be provided for biasing the piston toward the clutch disengaging members.

Retaining means can be provided for preventing the piston from rotating relative to the tubular portion.

Restricting means can be provided for restricting the amount of movement of the piston toward the clutch.

The restricting means can be provided by a retaining ring on the propeller shaft.

The restricting means can be provided by bolts disposed between the piston and the hollow cylinder.

The hollow cylinder can be formed with an oil pressure relief port which communicates with the cylinder chamber immediately before the piston reaches a projection limit.

The oil pressure supplying means can be provided with a pressure sensor for detecting an abnormal oil pressure when the clutch pedal is depressed, and malfunction handling means operable upon the pressure sensor detecting the abnormal oil pressure.

The oil pressure supplying means can be provided with an oil tank, a low level sensor for detecting a lowered oil level in the oil tank, and engine stopping means for rendering the engine inoperative upon the sensor detecting the lowered oil level.

Alarm means can also be provided which operates upon the sensor detecting the lowered oil level.

Means can be provided for detecting the home position of the piston.

BEST MODE OF CARRYING OUT THE INVENTION

Embodiments of the present invention will be described below with reference to the drawings.

Figure 1:
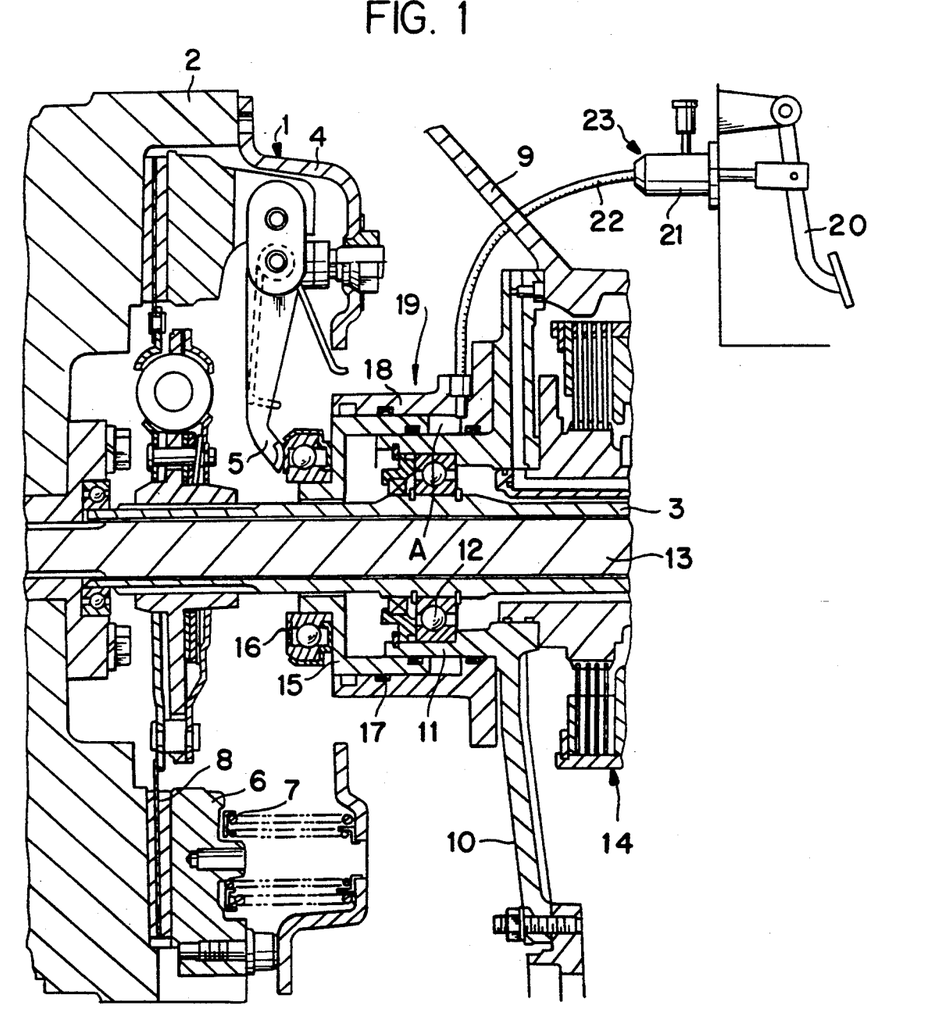
FIG. 1 is a sectional view showing an embodiment of the invention.

Referring to FIG. 1, a dry single-plate clutch is used as the main clutch of the running system of a farm tractor. The clutch is provided between a flywheel 2 fixed to the crankshaft of an engine and a propeller shaft 3 for effecting or interrupting the transmission of power from the flywheel 2 to the propeller shaft 3.

Secured to the flywheel 2 is a clutch cover 4 which has a pressure plate 6 connected thereto by clutch disengaging members 5, i.e., disengaging levers. Pressure springs 7 are provided between the clutch cover 4 and the pressure plate 6. A clutch disk 8 interposed between the flywheel 2 and the pressure plate 6 is mounted on the propeller shaft 3 and is axially slidable relative thereto.

A clutch housing 9 is connected to a flywheel housing and having inside thereof a support wall 10, which is bolted to the housing (or formed integrally therewith). The support wall has a tubular portion 11 projecting forward and rotatably supporting the propeller shaft 3 by a bearing 12.

The propeller shaft 3 is a tubular shaft having inserted therethrough a power take off (PTO) propeller shaft 13 connected directly to the crankshaft. Fitted to the propeller shaft 3 in the rear of the support wall 10 are a hydraulic clutch 14, gear, etc. for changing the speed of the running system. A release hub 15 is axially movably provided around the shaft 3 between the support wall 10 and the clutch 1.

The release hub 15 comprises large and small two tubular portions. The small tubular portion has a release bearing 16 mounted thereon and adapted to come into contact with the clutch disengaging members 5. The large tubular portion serves as an annular piston 17.

Provided on the support wall 10 around the tubular portion 11 concentrically therewith is a hollow cylinder 18 having one end fixed to the support wall 10 with bolts. The tubular portion 11 and the hollow cylinder 18 provide a hydraulic cylinder 19 having a cylinder chamber A which is open toward the clutch 1. The annular piston 17 is fitted in the chamber.

The annular piston 17, cylinder chamber A, release bearing 16, etc. are concentric with the propeller shaft 3. An oil under pressure, when supplied to the cylinder chamber A, produces a pressure on the release bearing 16 uniformly over the entire circumference thereof, causing the bearing to push the disengaging members 5 to disengage the clutch 1.

The tractor has a clutch pedal 20, which, when depressed, actuates a master cylinder 21 on the tractor body to supply the oil pressure to the cylinder chamber A through a hose (or pipe) 22. These parts are provided by pressure oil supply means 23.

With the clutch operating device shown in FIG. 1, the oil pressure is supplied from the master cylinder 21 of the supply means 23 to the cylinder chamber A via the hose 22 when the clutch pedal 20 is depressed. The annular piston portion 17 of the release hub 15 is fitted in the cylinder chamber A, so that the oil pressure axially pushes the release hub 15 over the entire circumference thereof, bringing the release bearing 16 into contact with the clutch disengaging members 5 to cause the bearing to push these members and disengage the clutch 1.

Figure 2:
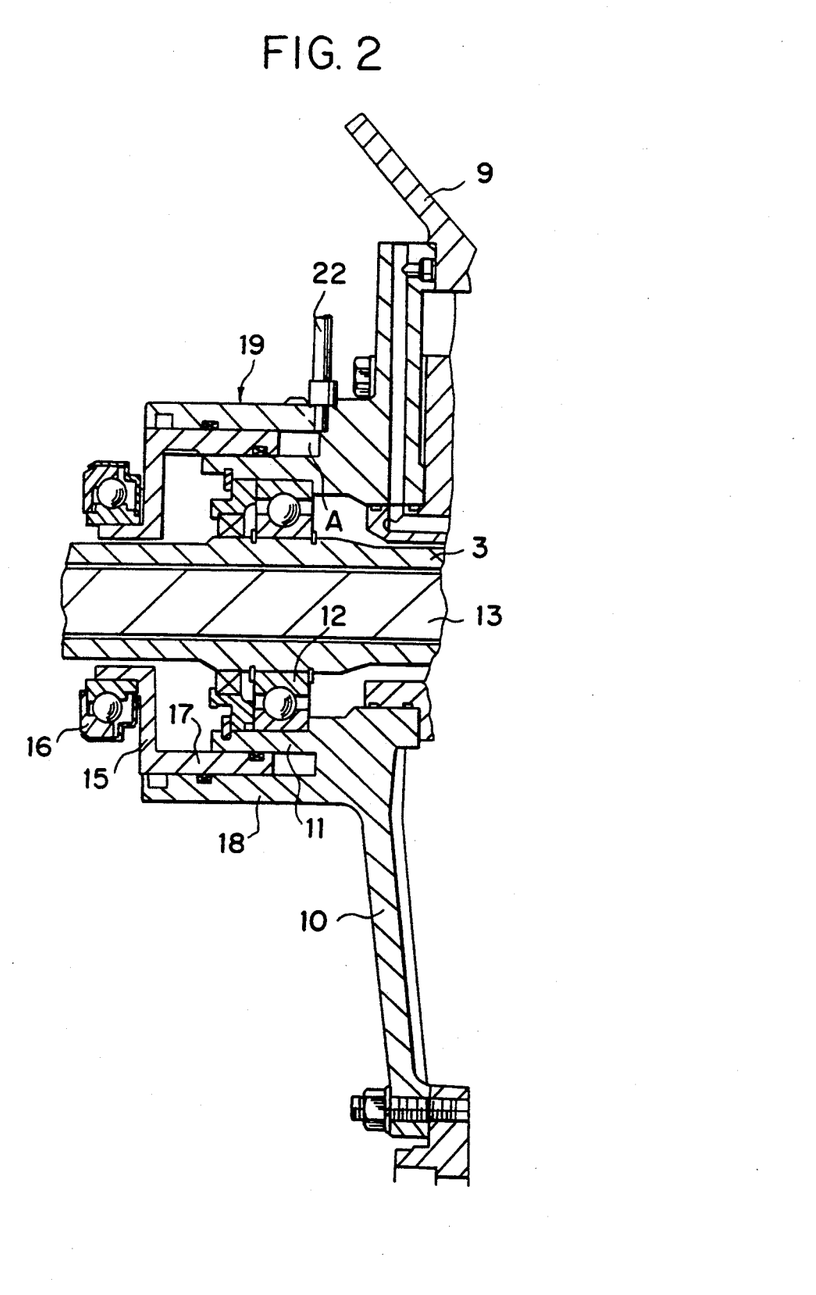
FIG. 2 is a sectional view showing a modified hydraulic cylinder.

FIG. 2 shows a modification of the hydraulic cylinder 19. The support wall 10 and the cylinder 18 of the foregoing embodiment are integral, and the two concentric tubes or cylinders define a cylinder chamber A. This support wall 10 is difficult to make integrally with the clutch housing and needs to be made as a separate wall.

Figure 3:
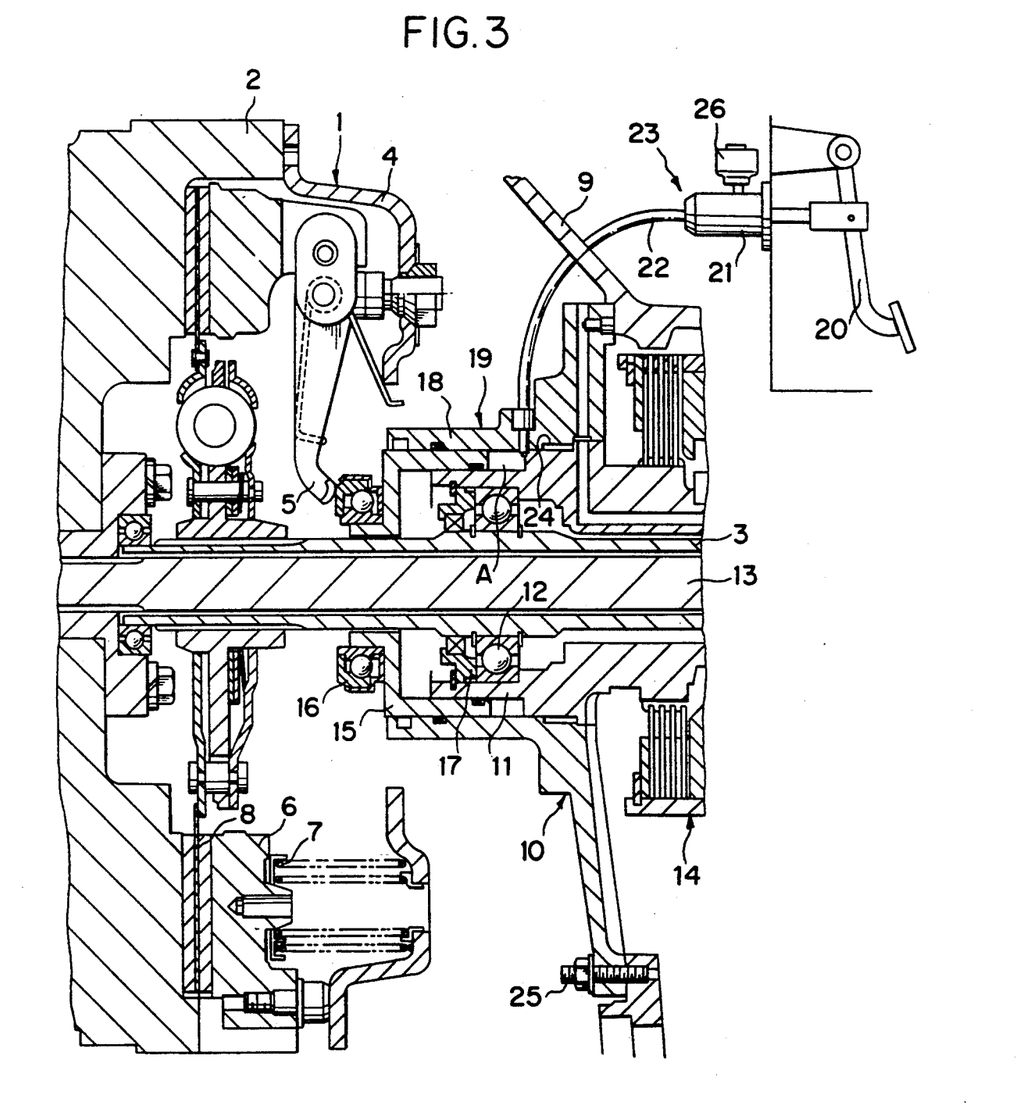
FIG. 3 is a sectional view showing another embodiment of the invention.

FIG. 3 shows another embodiment of the invention. The tubular portion 11 and the hollow cylinder 18 are made as separate members and are removably in screw-thread engagement with each other by threads 24. The cylinder 18 is fixed to the clutch housing 9 with bolts 25.

The master cylinder 21 of the pressure oil supply means 23 is provided with an oil tank 26.

When the clutch pedal 20 is depressed, oil is supplied from the oil tank 26 to the cylinder chamber A, and the oil pressure axially pushes out the annular piston 17. The movement of the piston 17 pushes the release levers 5 with the release hub 15 to disengage the clutch 1 to interrupt power transmission.

Figure 4:
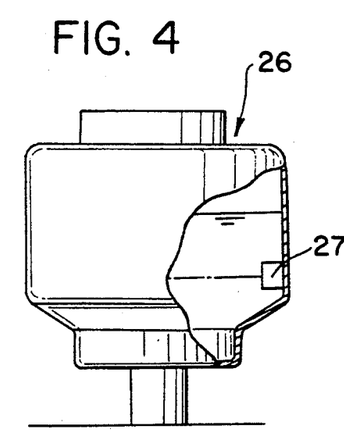
FIG. 4 is a side elevation partly in section of an oil tank.

As seen in FIG. 4, the oil tank 26 is provided with a low level sensor 27 for detecting a lowered oil level within the oil tank 27. When the oil within the tank 26 descends to the definite level or lower, the sensor is turned on.

Figure 5:
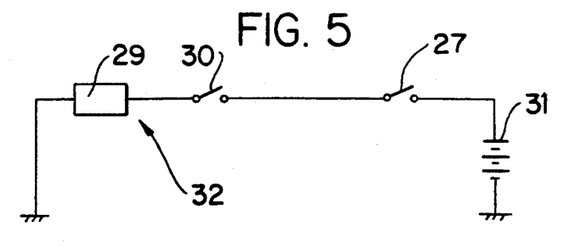
FIG. 5 to FIG. 8 are circuit diagrams.

FIG. 5 shows a starter 29 for starting the engine, and a key switch 30. The starter 29, key switch 30 and low level sensor 27 are connected in series with a battery or like power supply 31. Thus, an engine stopping means 32 for rendering the engine unable to start (inoperative) upon the sensor 27 detecting the lowered level is provided by incorporating the low level sensor 27 into the series circuit of starter 29 and key switch 30 in series therewith.

Figure 6:
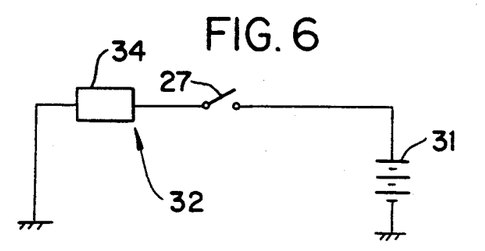

FIG. 6 shows another embodiment, wherein an engine stopping solenoid 34 is connected in series with the low level sensor 27 to thereby provide engine stopping means 32. The engine stopping solenoid 34 is so designed as to close the valve of the fuel injection pump for supplying fuel to the engine when energized. Accordingly, the solenoid 34 is actuated upon the sensor 27 detecting the lowered level to stop the engine in operation.

Figure 7:
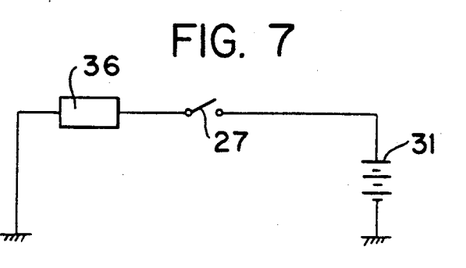

FIG. 7 shows another embodiment, wherein an alarm lamp, alarm buzzer or like alarm means 36 is connected in series with the low level sensor 27, such that the alarm means 36 is actuated upon the sensor 27 detecting the lowered level.

Figure 8:
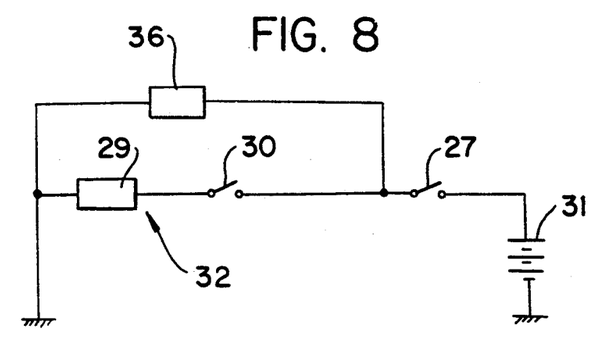

FIG. 8 shows another embodiment, wherein the alarm means 36 is connected in parallel with the series circuit of starter 29 and key switch 30 shown in FIG. 5.

The foregoing embodiments including the low level sensor are so adapted as to cause the engine stopping means 32 to render the engine inoperative upon the oil within the tank 26 lowering to the definite level. This eliminates the likelihood that the vehicle will travel with difficulty encountered in the operation of the clutch 1 due to a reduction in the amount of oil in the tank 26, ensures improved safety and enables the operator to repair the oil tank 26 or the like or supply the oil promptly.

Further upon the reduction in the amount of oil in the tank 26, the alarm means 36 gives an alarm to notify the operator of the reduction immediately, so that the oil tank 26 or the like can be repaired or replenished with oil before the clutch 1 becomes difficult to operate, hence improved safety.

FIGS. 9 to 15 show another embodiment of the invention. In this embodiment, the hollow cylinder 18 is formed with a pair of cutout grooves (engaged portions) 38 extending from its front end axially thereof and positioned symmetrically diametrically thereof.

The piston 17 is provided at its front end with a pair of projections (engaging portions) 39 projecting outward radially thereof and fitting in the cutout grooves 38 of the hollow cylinder 18, whereby the release hub 15 is held against rotation. Thus, the cutout grooves 38 and the projections 39 provide retaining means 40 (see FIG. 10). The projections 39 are free to move through the grooves 38 longitudinally thereof and will not prevent the axial movement of the release hub 15.

Figure 9:
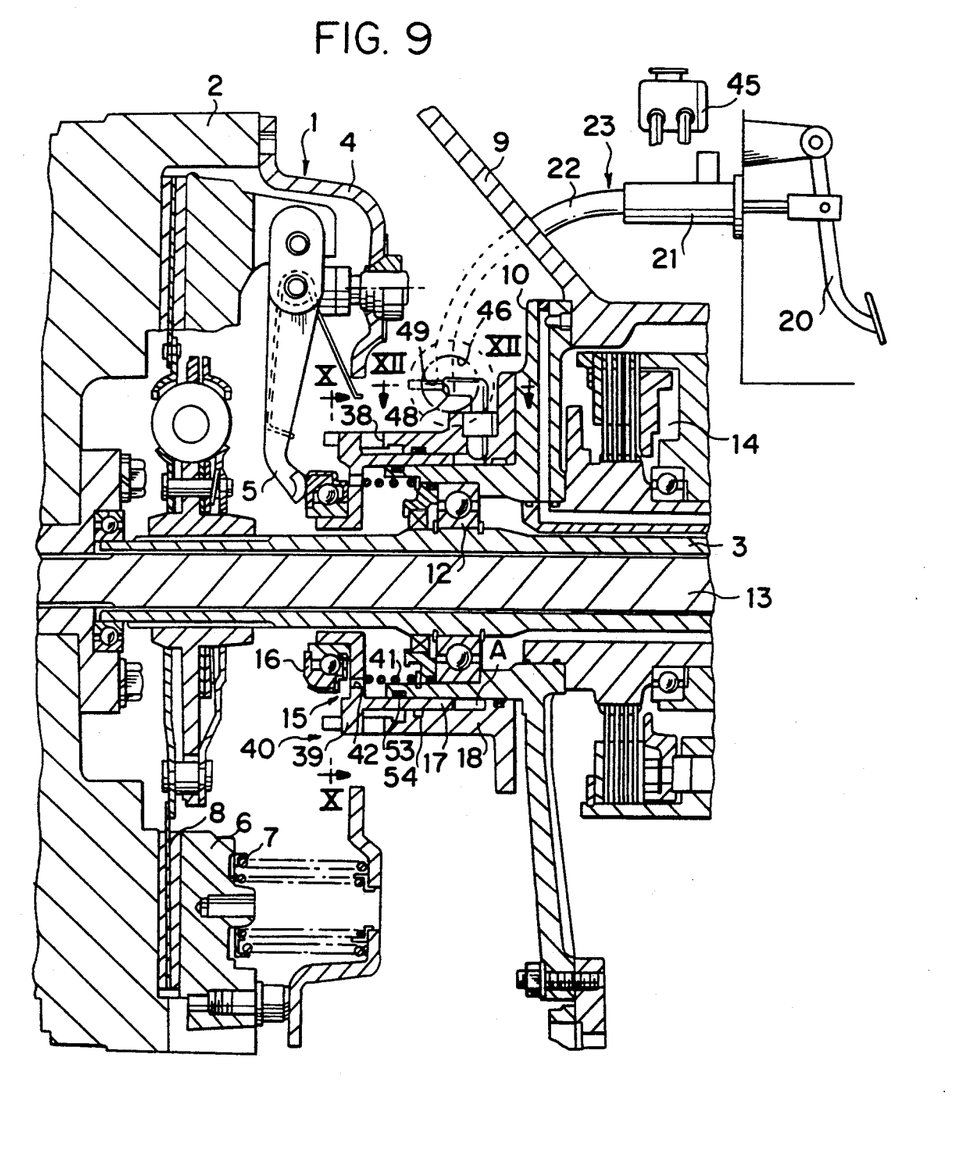
FIG. 9 is a sectional view showing another embodiment of the invention.
Figure 10:
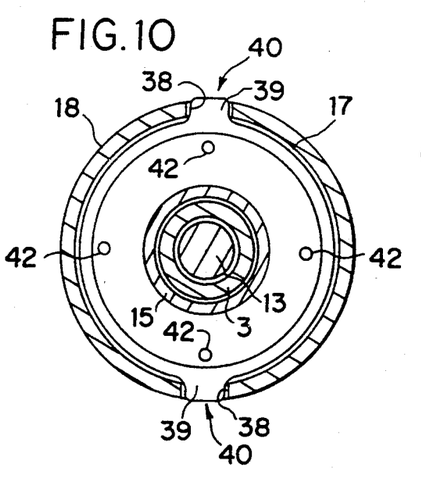
FIG. 10 is a view in section taken along the line X—X in FIG. 9.

A coiled compression spring 41 is provided between the release hub 15 and the tubular portion 11 for biasing the release hub 15 toward the clutch disengaging members 5. The coiled spring 41 is sufficiently smaller than the pressure springs 7 in biasing force and will not decrease the pressure applied to the clutch disk of the clutch 1. The front portion of the release hub 15 has air vents 42 for preventing the thermal deformation of the coiled spring 41.

Figure 11:
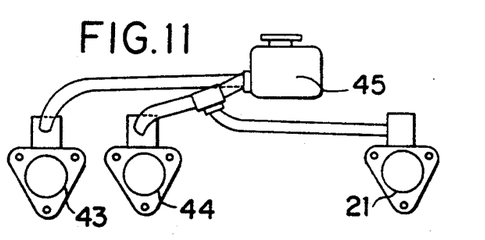
FIG. 11 is a diagram showing a piping system for a tank and brake and clutch master cylinders.
Figure 12:
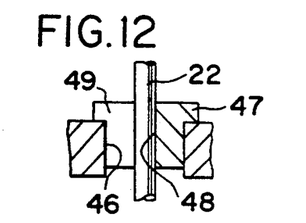
FIG. 12 is a view in section taken along the line XII—XII in FIG. 9.

With reference to FIG. 11, a tank 45 for master cylinders 43, 44 for hydraulic brakes is adpated to supply working oil to the master cylinder 21 for the clutch and thus made to serve also for the clutch. The pipe 22 extends into the clutch housing 9 through a hole 46 in a side portion of the housing and is inserted through and supported by a rubber tube 47 fitted in the hole 46. As seen also in FIG. 12, the rubber tube 47 has an insertion passage 48 for the pipe 22 to extend therethrough, and a slit 49 radially extending outward from the passage 48 for inserting the pipe 22 into the passage 48. The slit 49 serves as an air channel for lowering the internal temperature of the clutch housing 9.

Figure 13:
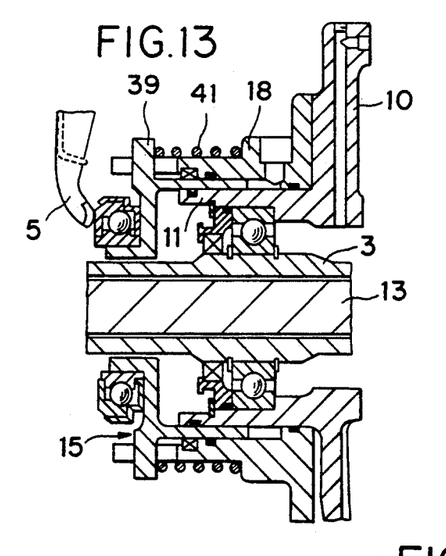
FIG. 13 is a sectional view showing a modification.

As seen in FIG. 13, the coiled spring 41 may be fitted around the hollow cylinder 18, with one end of the spring 41 bearing against the projections 39 of the release hub 15 and the other end thereof against a portion of the cylinder 18.

Figure 14:
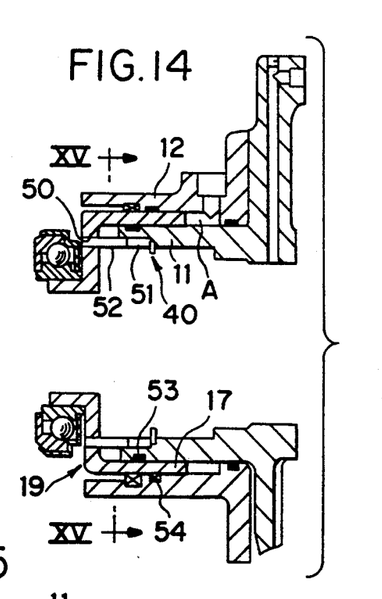
FIG. 14 is a fragmentary side elevation in section showing another embodiment.
Figure 15:
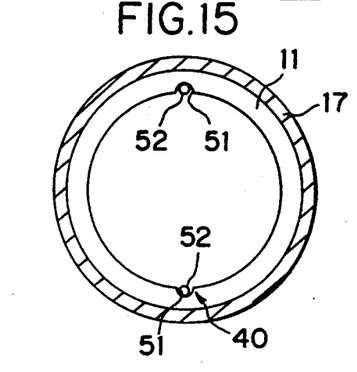
FIG. 15 is a view in section taken along the line XV—XV in FIG. 14.

FIGS. 14 and 15 show another embodiment, wherein the means 40 for preventing the rotation of the release hub 15 comprises axial grooves (engaged portions) 51 formed in the inner surface of the tubular portion 11 at its front end, and roll pins (engaging portions) 52 fitting in the respective grooves 51 and implanted in holes 50 formed in the release hub 15.

The projection 39 and the cutout groove 38, or the roll pin 52 and the groove 51 may be positioned in reverse relation with each other.

The retaining means 40 of the above embodiment prevents the rotation of the piston 17 and therefore precludes damage to the seals 53, 54 of the piston.

Figure 16:
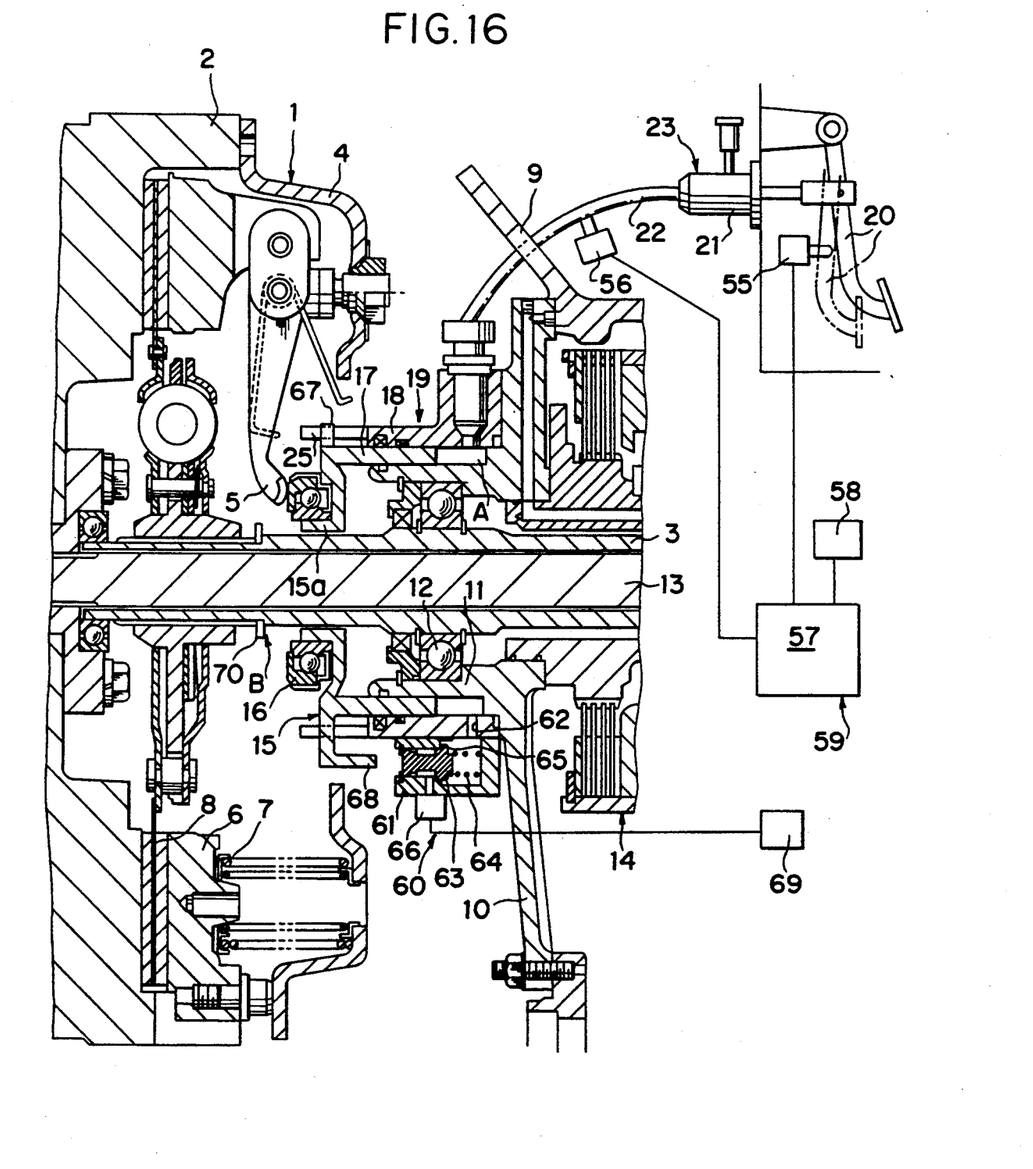
FIG. 16 is a sectional view showing another embodiment of the invention.
Figure 17:
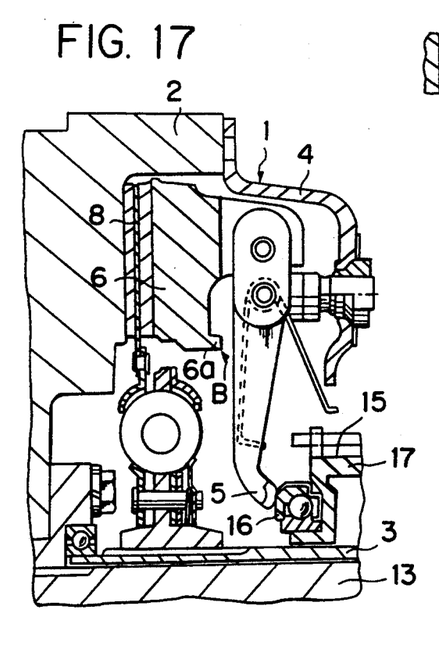
FIG. 17 is a fragmentary view in section showing projection restricting means.
Figure 18:
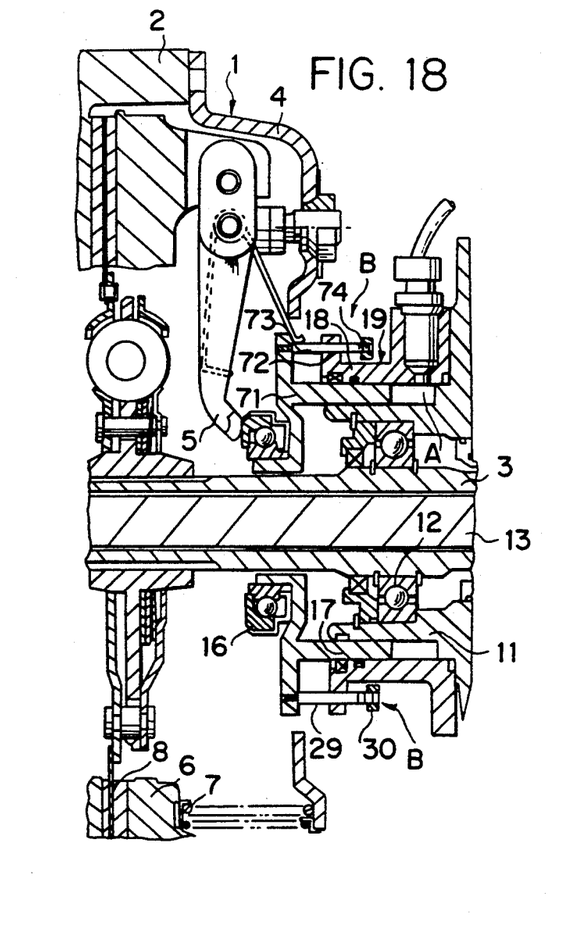
FIG. 18 is a sectional view showing another projection restricting means.

FIGS. 16 to 18 show another embodiment of the invention. Indicated at 55 is a pedal sensor operable by the depression of the clutch pedal 20, and at 56 is a pressure gauge or like pressure sensor provided for the pipe 22. The two sensors 55, 56 are connected to a control box 57.

Although not shown, the pedal sensor 55 is coupled to the starter switch to render the engine inoperative unless the sensor is on. The pedal sensor 55, when actuated, permits the pressure sensor 56 or the control box 57 to function.

The pressure sensor 56 detects the pressure of oil in the oil supply means 23, and the pressure is compared by a comparator within the control box 57 with a predetermined pressure at which the clutch 1 is normally disengaged by the depression of the clutch pedal 20, such that if the pressure detected is lower, the control box 57 detects a pressure abnormality to recognize oil leakage.

An alarm 58, connected to the control box 57, is an alarm buzzer, alarm lamp, or switch or lever actuator for stopping the engine and constitutes a malfunction handling means 59 along with the control box 57.

The pressure sensor 56 may be provided on any of the members including the master cylinder 21 through the hydraulic cylinder 19. The alarm 58 may be so adapted as to function if the sensor 55 fails to detect the predetermined pressure when turned on.

The hydraulic cylinder 19 is further provided with a clutch wear limit detector 60. The hollow cylinder 18 has a valve casing 61, the interior of which is in communication with the cylinder chamber A via a channel 62. A valve disk 63 is provided inside the valve casing 61.

The valve disk 63 is held in contact with a valve seat 65 by a spring 64 so that no oil pressure will be applied to a pressure sensor 66 provided outside the casing 61. The valve disk 63 can be pushed by a pushing member 68 provided on a bored projection 67 of the annular piston 17.

When the clutch disk 8 of the clutch 1 wears almost to a limit, the position to which the piston 17 is returned when the clutch is engaged gradually shifts rightward in FIG. 16, with the result that the pushing member 68 pushes the valve disk 63 against the spring 64 to open the valve, permitting the internal oil pressure of the valve casing 61 to act on the pressure sensor 66.

The pressure sensor 66 is connected to an alarm 69 to actuate an alarm buzzer, alarm lamp or the like upon detecting the oil pressure. The pressure sensor 66 may be connected to the control box 57.

The propeller shaft 3 is provided with projection restricting means B comprising a retaining ring 70 or split collar. The retaining ring 70 is adapted to come into contact with the small tubular portion 15a of the release hub 15, providing a limit to the projection of the piston 17 in the pushing-out direction. When the small tubular portion 15a is in contact with the retaining ring 70, the piston 17 has not slipped off from the cylinder chamber A, nor are the clutch disengaging members 5 subjected to an excessive pressure, and the piston is prevented from projecting further, with the members 5 held out of contact with the clutch disk 8.

FIG. 17 shows projection restricting means B which is in the form of a protrusion 6a formed on the pressure plate 6. When pushed by the piston 17 projected piston 17, the clutch disengaging members 5 come into contact with the protrusion 6a, restricting further projection of the piston 17.

With reference to FIG. 18 showing another embodiment, the outer periphery of the piston 17 and the outer periphery of the hollow cylinder 18 are provided with projections 71, 72, respectively. These projections 71 or 72 are formed at one end of the piston or cylinder closer to the clutch 1 and equidistantly spaced along the circumference. Rods 73 are screwed in the respective projections 71 of the piston 17, extend through the respective projections 72 of the hollow cylinder 18 and each carry a nut 74 screwed on the free end.

The rods 73 extending through the projections 72 permit the piston 17 to move axially but prevent the piston 17 from rotating relative to the hollow cylinder 18. The nuts 74 restrict the amount of projection of the piston 17 by coming into contact with the projection 72. Thus, the nuts 74 constitute projection restricting means B. The limit position of projection of the piston 17 is adjustable by varying the position of the nuts 74.

With the embodiment described above, the oil supply means 23 is provided with the pressure sensor 56 for detecting an abnormal oil pressure when the clutch is disengaged, and the malfunction handling means 59 operable upon the pressure sensor 56 detecting an abnormal oil pressure when the pedal sensor 55 operates. Accordingly, when an abnormality occurs in the oil pressure, for example, due to an oil leak from the oil supply means 23 or cylinder chamber A, the pressure sensor 56 detects the abnormality to actuate the malfunction handling means 59. Thus, oil leakage or like fault can be detected immediately to give an alarm.

Further the piston 17 having the release bearing 16 for engaging and disengaging the clutch 1 has an amount of its projection restricted by means B, so that even if the piston 17 is projected by manipulating the clutch pedal 20 like a pump, the piston 17 can be restrained from slipping off from the cylinder chamber A, while the clutch disengaging members 5 are also prevented from being pushed by an excessive pressure or from contacting the clutch disk 8.

Figure 19:
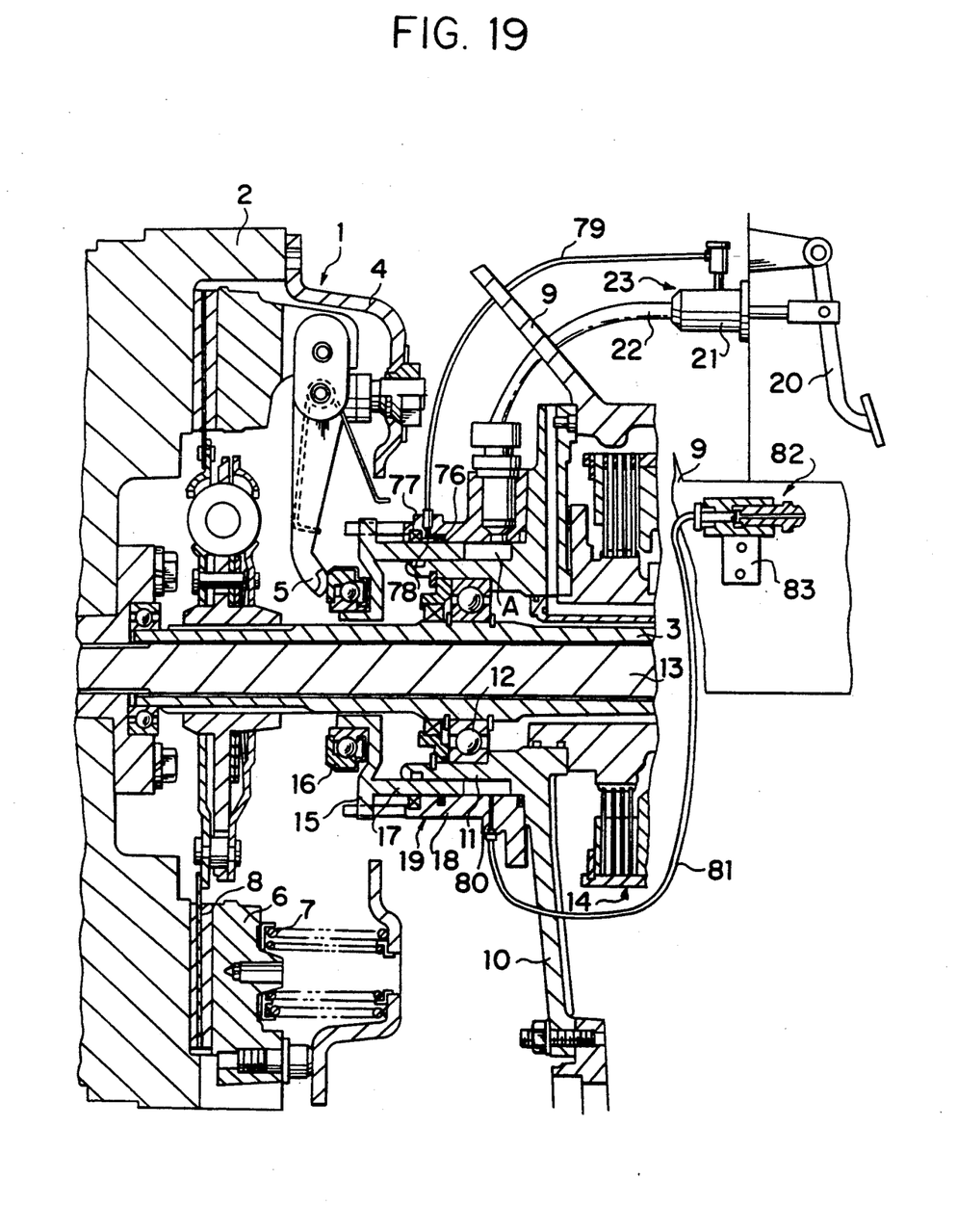
FIG. 19 is a sectional view showing another embodiment of the invention.
Figure 20:
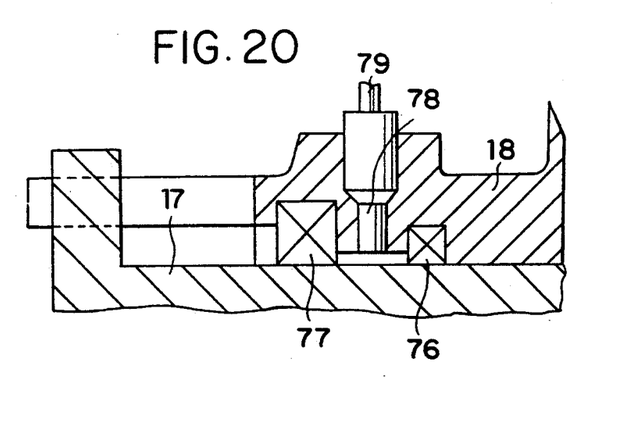
FIG. 20 is a fragmentary side elevation in section.
Figure 21:
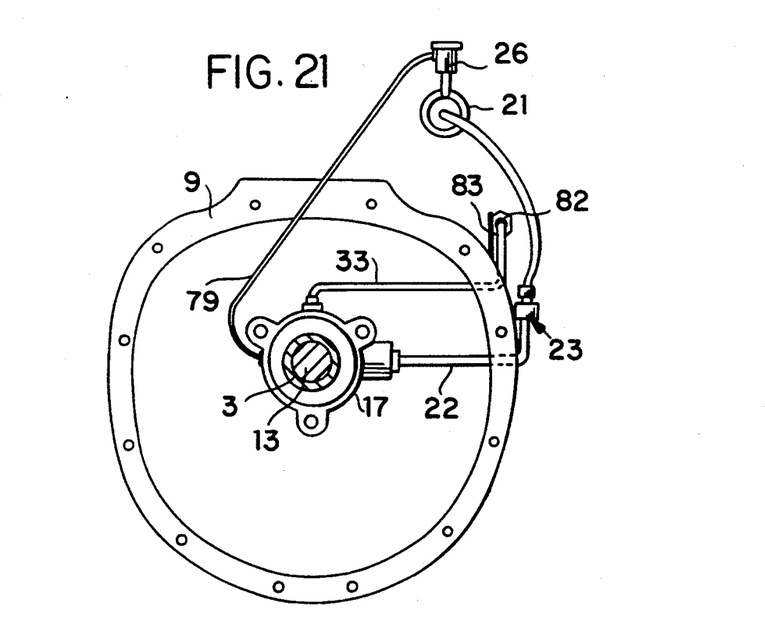
FIG. 21 is a front view of a hydraulic cylinder portion.

FIGS. 19 to 21 show another embodiment of the invention, in which the hollow cylinder 18 has an oil seal 76 and a dust seal 77 fitted in its inner peripheral surface, with an oil pressure relief port 78 formed between the two seals 76 and 77. The relief port 78 remains closed when the clutch pedal 20 is depressed once since the right end of the piston 17 shown in FIG. 19 is not brought to the position of the oil seal 76. However, when the right end of the piston 17 is brought to the left side of the oil seal 76 by the pumping movement of the pedal, that is, when the piston 17 is almost brought to the limit of its projection, the port 78 communicates with the cylinder chamber A before the piston is positioned at the limit, permitting the pressure oil to escape from the cylinder chamber A to the outside via the relief port 78. This prevents the piston 17 from reaching the limit of projection.

The oil thus released may be introduced into the transmission case, whereas the amount of oil in the master cylinder 21 then decreases. Accordingly, the oil is returned to the oil tank 26 via a return pipe (or hose) 79.

A vent 80 for removing air is formed in an upper portion (lower portion in FIG. 19) of the hollow cylinder 18. The vent 80 serves to remove air from the cylinder chamber A and is held in communication with an air discharger 82 by a pipe (or hose) 81.

The air discharger 82, which may be mounted on any portion of the tractor body, is preferably attached to the clutch housing 9 in the vicinity of the clutch pedal 20 or to a side upper portion of the transmission case with use of a bracket 83. Since air must be removed from the hydraulic cylinder 19 by manipulating the air discharger 82 while depressing the clutch pedal 20, the discharger is preferably accessible by the hand of the operator.

According to the embodiment described, the hollow cylinder 18 is formed with the oil pressure relief port 78 which communicates with the cylinder chamber A before the piston 17 substantially reaches the limit position of its projection, so that even if the piston 17 is projected by the pumping action of the clutch pedal 20, the cylinder chamber A can be relieved of the oil pressure before the piston substantially reaches the projection limit position. This prevents the clutch disengaging members 5 from being subjected to an excessive pressure or being brought into contact with the clutch disk 8 to obviate damage to the clutch 1.

Figure 24:
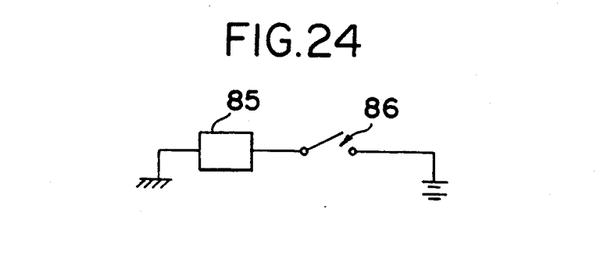
FIG. 24 is an electric circuit diagram.

FIGS. 22 to 25 show another embodiment of the invention. A sensor 84 (wear detecting means) is provided for detecting wear on the clutch facing 8a of the clutch disk 8. The sensor comprises a limit switch and is attached to the hollow cylinder 18 so as to be opposed to the projecting end 39a of the projection 39 of the release hub 15 at a distance therefrom. As shown in FIG. 24, the sensor has a normally open contact 86 connected in series with an alarm lamp, alarm buzzer or like alarm means 85 mounted on a panel in front of the driver's seat.

Figure 22:
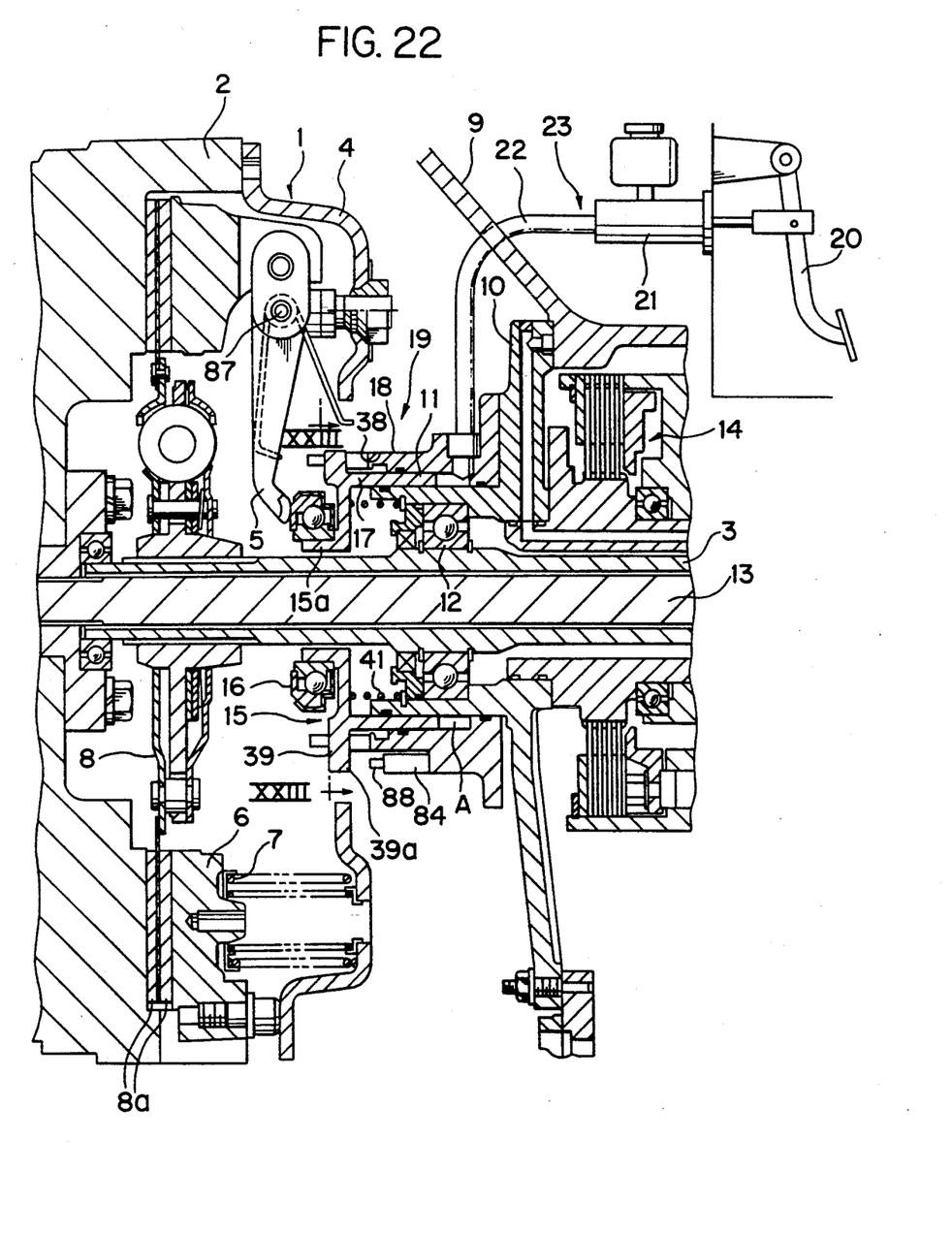
FIG. 22 is a sectional view showing another embodiment of the invention.
Figure 23:
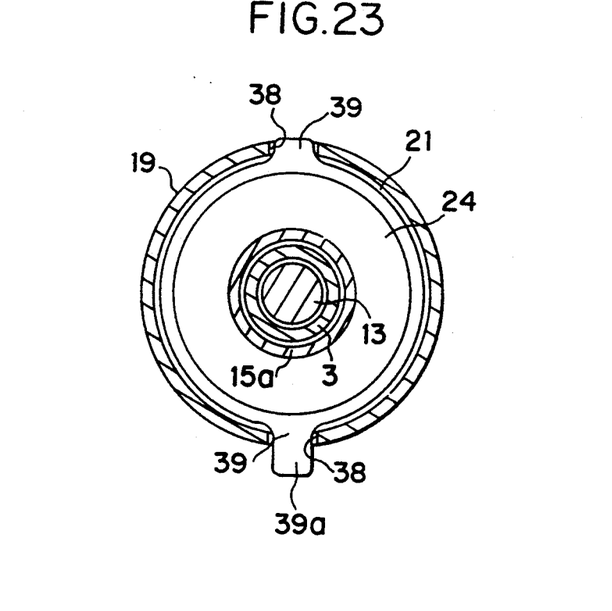
FIG. 23 is a view in section taken along the line XXIII—XXIII in FIG. 22.

FIG. 22 shows the above construction with the clutch 1 in the engaged state. At this time, each projection 39 of the release hub 15 is at a lengthwise intermediate portion of the cutout groove 38. When pressure oil is supplied to the cylinder chamber A by depressing the cltuch pedal 20 in this state, the release hub 15 moves forward, causing the release bearing 16 to push each clutch disengaging member 5 to thereby move the member 5 about a pivot 87 clockwise in FIG. 22, whereby the pressure plate 6 is moved rearward. This produces a clearance between the outer peripheral portion of the clutch disk 8 and each of the flywheel 2 and the pressure plate 6 to interrupt the transmission of power from the engine to the propeller shaft 3.

When released from the foot, the clutch pedal 20 is returned by an unillustrated spring, causing the force of the pressure springs 7 to exert a pressure on the pressure plate 6, which in turn presses the outer peripheral portion of the clutch disk 8 into contact with the flywheel 2 for the transmission of power from the engine to the propeller shaft 3. At the same time, each clutch disengaging member 5 is moved about the pivot 87 counterclockwise in FIG. 1 for a return movement. The release hub 15 is rearwardly moved and pushed back to the original position by the clutch disengaging member 5. Thus, the pressure springs 7 serve also as springs for returning the release hub 15. Accordingly, the clutch disengaging member 5 is in contact with the release bearing 16 at all times. As the clutch facings 8a wear, the pressure plate 6 shifts forward, moving the clutch disengaging member 5 counterclockwise in FIG. 22 to gradually shift the release hub 15 rearward. When the clutch facings 8a reach a limit of wear (limit to use) or before they reach the limit, the projecting end 39a of the projection 39 of the release hub 15 comes into contact with a plunger 88 of the sensor 84 to close the normally open contact 86 of the sensor 84 and actuate the alarm means 85. The operator therefore recognizes that the clutch disk 8 is to be replaced.

Figure 25:
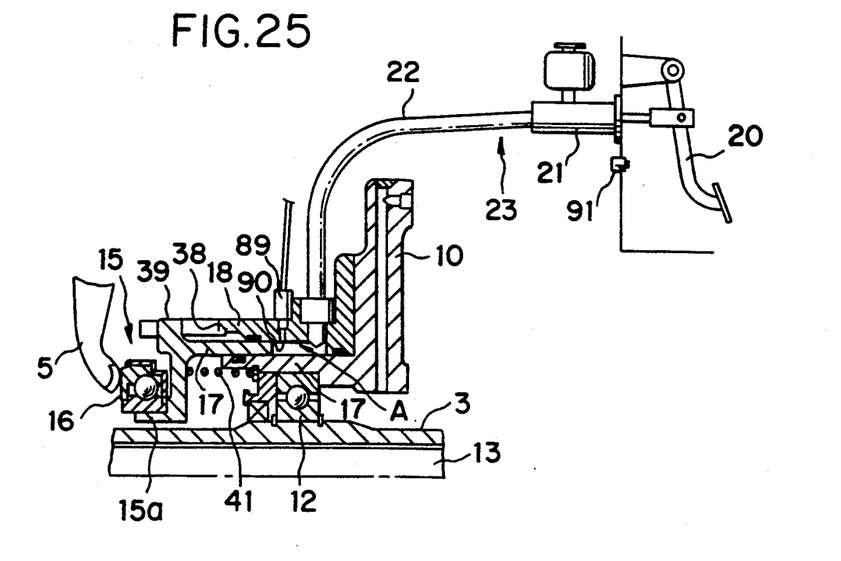
FIG. 25 is a side elevation in section showing another embodiment.

FIG. 25 shows another embodiment, wherein a pressure sensor 89 is disposed in an oil channel 90 communicating with the cylinder chamber A, and a safety switch 91 is adapted to come into contact with the clutch pedal 28 when the pedal 28 is depressed, rendering the engine ready to start. The present embodiment is so adapted as to actuate alarm means when the clutch pedal 20 is brought into contact with the safety switch 91, with the pressure sensor 89 detecting no pressure.

More specifically, FIG. 25 shows the clutch in its engaged state. At this time, the oil channel 90 is in communication with the cylinder chamber A. As the clutch facings become worn, the opening of the oil channel 90 is closed with the piston 17 of the release hub 15. However, before the wear on the clutch facings reaches a limit, the oil channel 90 is brought into communication with the cylinder chamber A when the release hub 15 is moved forward by depressing the clutch pedal 20. When the wear of the clutch facings reaches the limit, the rear end of the piston 17 of the release hub 15 is positioned in the rear of the oil channel 90 to close the opening of the channel 90 even if the hub 15 is moved forward by the depression of the clutch pedal 20. At this time, the clutch pedal 20 comes into contact with the safety switch 91, and the pressure sensor 89 detects no pressure, so that the alarm means goes on. The pressure sensor 89 and the safety switch 91 or the like provide wear detecting means.

According to the embodiment described, the wear on the clutch disk is detected by the wear detecting means, whereupon the alarm means provides a notice. This serves to preclude damage to the clutch, etc., properly indicates when to replace the clutch disk, ensures convenience in maintenance and further assures an improved life without necessitating early replacement of the clutch disc.

The present invention is not limited to the foregoing embodiments but can be modified variously. For example, the clutch 1 may be a dual clutch for effecting and interrupting power transmission to the propeller shafts 3, and 13 for the running system and the PTO system, or the clutch disengaging member 5 may be a diaphragm spring.

INDUSTRIAL APPLICATION

The present invention is usable as a clutch operating device for tractors and like vehicles.

We claim:

1. A clutch operating device for use in vehicles for pushing the clutch disengaging members of a dry disk clutch which is disposed between a flywheel mounted on the output shaft of an engine and a propeller shaft rotatably supported by a support wall of a transmission case, the device being characterized in that the device comprises:

an annular cylinder chamber provided on the support wall concentrically with the propeller shaft;

an annular piston axially slidably fitted in the cylinder chamber;

a release bearing mounted on the forward end of the piston and engageable with the clutch disengaging members by contact therewith;

means for supplying an oil pressure to the cylinder chamber by depressing a clutch pedal to push out the piston toward the clutch disengaging members; and restricting means for restricting the amount of movement of the piston toward the clutch, said restricting means includes a retaining ring provided on the propeller shaft.

2. The vehicle clutch operating device according to claim 1, wherein said means for supplying an oil pressure includes an oil tank, a low level sensor for detecting a lowered oil level in the oil tank and engine stopping means for rendering the engine inoperative upon the low level sensor detecting the lowered oil level.

3. The vehicle clutch operating device according to claim 1, wherein a bearing is interposed between an inner surface of a tubular portion and the propeller shaft.

4. The vehicle clutch operating device according to claim 1, wherein retaining means are provided for preventing the piston from rotating relative to a tubular portion.

5. A clutch operating device for use in vehicles for pushing the clutch disengaging members of a dry disk clutch which is disposed between a flywheel mounted on the output shaft of an engine and a propeller shaft rotatably supported by a support wall of a transmission case, the device being characterized in that the device comprises:

an annular cylinder chamber provided on the support wall concentrically with the propeller shaft;

an annular piston axially slidably fitted in the cylinder chamber;

a release bearing mounted on the forward end of the piston and engageable with the clutch disengaging members by contact therewith; and means for supplying an oil pressure to the cylinder chamber by depressing a clutch pedal to push out the piston toward the clutch disengaging members;

said cylinder chamber includes an annular space formed between a tubular portion surrounding the propeller shaft and projecting from the support wall toward the clutch and a hollow cylinder provided around the tubular portion, said hollow cylinder is formed with an oil pressure relief port communicating with the cylinder chamber only when the piston has reached a position immediately before a projection limit.

6. The vehicle clutch operating device according to claim 5, wherein a bearing is interposed between the inner surface of the tubular portion and the propeller shaft.

7. The vehicle clutch operating device according to claim 5, wherein retaining means are provided for preventing the piston from rotating relative to the tubular portion.

8. The vehicle clutch operating device according to claim 5, wherein restricting means are provided for restricting the amount of movement of the piston toward the clutch.

9. The vehicle clutch operating device according to claim 8, wherein the restricting means comprises a retaining ring provided on the propeller shaft.

10. The vehicle clutch operating device according to claim 8, wherein the restricting means comprises bolts disposed between the piston and the hollow cylinder.

11. The vehicle clutch operating device according to claim 1 or 5, wherein the cylinder chamber comprises a hollow cylinder provided around a tubular portion surrounding the propeller shaft, said hollow cylinder is in screw-thread engagement with the tubular portion.

12. The vehicle clutch operating device according to claim 1 or 5, wherein the cylinder chamber comprises a hollow cylinder provided around a tubular portion surrounding the propeller shaft, said hollow cylinder is formed integrally with the tubular portion.

13. The vehicle clutch operating device according to claim 1 or 5, wherein an elastic member is provided for biasing the piston toward the clutch disengaging members.

14. The vehicle clutch operating device according to claim 1 or 5, wherein the oil pressure supplying means is provided with a pressure sensor for detecting an abnormal oil pressure when the clutch pedal is depressed, and malfunction handling means operable upon the pressure sensor detecting the abnormal oil pressure.

15. The vehicle clutch operating device according to claim 1 or 5, and further including detecting means for detecting a home position of the piston.

* * * * *